No. 773,937. PATENTED NOV. 1, 1904.
F. HOLDEN.
TESTING THE MAGNETIC QUALITIES OF MATERIALS.
APPLICATION FILED JULY 6, 1903.
NO MODEL. 2 SHEETS—SHEET 2.
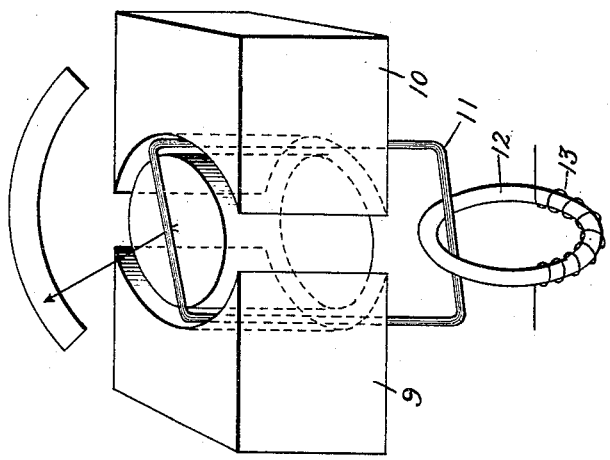
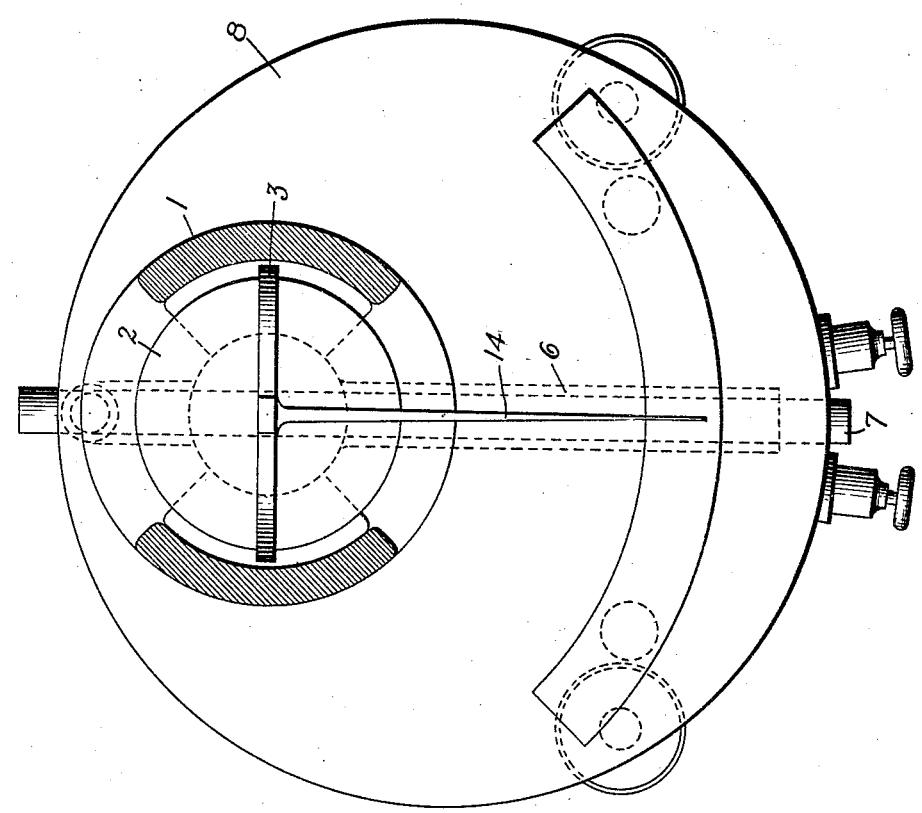
Witnesses.
Inventor.
Frank Holden.
by Albert G. Davis
Atty.

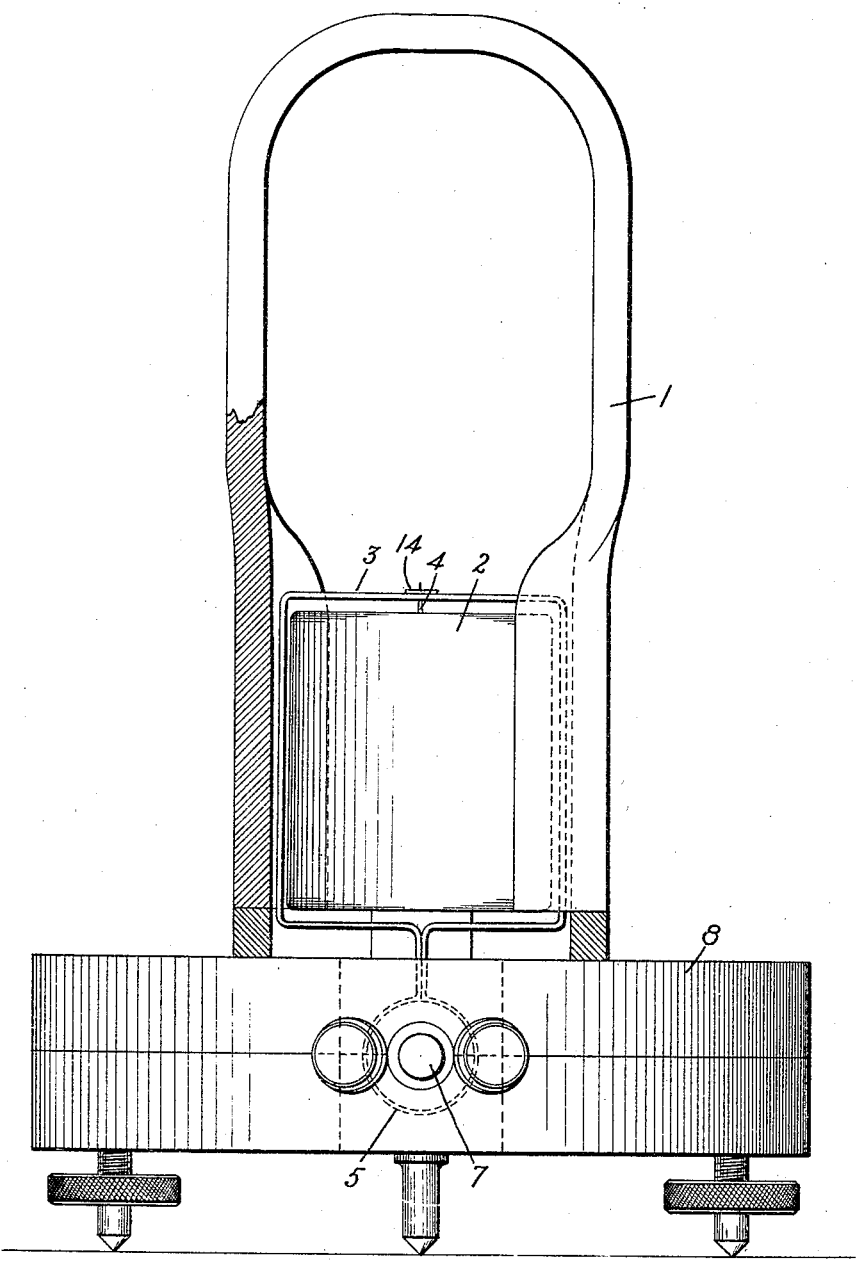

No. 773,937.  
Patented November 1, 1904.

UNITED STATES PATENT OFFICE.

FRANK HOLDEN, OF RUGBY, ENGLAND, ASSIGNOR TO GENERAL ELECTRIC COMPANY, A CORPORATION OF NEW YORK.

TESTING THE MAGNETIC QUALITIES OF MATERIALS.

SPECIFICATION forming part of Letters Patent No. 773,937, dated November 1, 1904.

Application filed July 6, 1903. Serial No. 164,279. (No model.)

*To all whom it may concern:*

Be it known that I, FRANK HOLDEN, a citizen of the United States of America, residing at Rugby, England, have invented certain new and useful Improvements in Testing the Magnetic Qualities of Materials, of which the following is a specification.

My invention relates to improvements in apparatus for determining the magnetic properties of metals, such as iron and steel, for use in dynamos, transformers, and other electromagnetic appliances, and has for its object to provide an apparatus whereby such metals in the form of bulk samples may be tested in a simple and expeditious manner.

The features of novelty characteristic of my invention I have endeavored to point out with particularity in the appended claims.

For a complete understanding of my invention, both as to its construction and mode of operation, reference is to be had to the following description, taken in connection with the accompanying drawings, in which—

Figure 1 is an elevation, partly in section, of an instrument embodying my invention. Fig. 2 is a plan view of the instrument, while Fig. 3 is a more or less conventional and diagrammatic view for illustrating the elements of the invention.

In carrying my invention into practice I provide a uniform or practically uniform magnetic field, and in this magnetic field I suspend a movable closed conducting-circuit of such form as to allow the sample to be tested to be linked with it. Variations of magnetism produced in the sample by a magnetizing-coil generate currents which operate to produce a displacement of the conductor in the magnetic field, which displacement is proportional to the change in magnetic flux of the test sample. As shown in Fig. 1, the uniform magnetic field is provided by a permanent magnet 1, the poles of which are spread out and partly surround a fixed iron cylinder 2, but without touching the latter. In the space between the cylinder 2 and the pole-pieces of the magnet 1 a closed conducting circuit or coil 3, of copper or other suitable metal wire, is supported so as to allow free rotation of the same. The support may be afforded by any appropriate means, such as a silk suspension fiber or by a pivot, as indicated at 4. The coil 3 extends down below the cylinder 2 in the form of a suitably-shaped loop, such as indicated at 5. This loop surrounds a magnetizing-coil (indicated in dotted lines at 6 in Fig. 2) and is of sufficient diameter so that it may rotate through a considerable angle without coming into contact with the coil. The bar to be tested, after being brought to the proper size, is inserted in the coil, as indicated at 7. The magnetic circuit of the bar is completed by the base 8, which itself is of magnetic material. The arrangement thus described as embodied in a practical instrument is shown in a somewhat simpler manner in Fig. 3, in which the pole-pieces of the exciting-magnet are represented at 9 and 10, the movable coil at 11, and the test-piece, in the present instance in the form of a ring, linked about the coil 11. The exciting-winding for the test-piece is represented at 13.

In making a measurement with the instrument a known current is passed through the exciting-coil and then either interrupted or reversed. The current induced in the closed conductor causes the latter to move in the uniform magnetic field through an angle proportional to the change of flux produced through the closed conductor by the test-piece. When the coil has come to rest, its angle of deflection may be measured by a suitable pointer, such as at 14 in Fig. 2. This angle, as before mentioned, is proportional to the change of flux in the sample. It is read, however, while the pointer is at rest and not, as in the case of the ordinary ballistic galvanometer, when the pointer has reached the maximum deflection in an oscillating movement.

In the foregoing description and accompanying drawings I have illustrated but one of the various forms which my invention may assume. I therefore do not wish to be limited to the exact form shown and described, since it will be evident to one skilled in the art that various modifications thereof can be made without departing from the spirit of my invention.

What I claim as new, and desire to secure by Letters Patent of the United States, is—

1. In a measuring instrument, the combination of means for producing a uniform magnetic field, a closed conductor suspended so as to move in the magnetic field, and a test-piece linked through the circuit of the conductor.

2. In an instrument, the combination of means for producing a magnetic field, a closed conductor arranged to move in the magnetic field, a test-piece arranged so that its magnetic circuit is interlinked with the circuit of said closed conductor, and means for varying the flux in said test-piece.

3. In an instrument for testing the magnetic qualities of iron or other magnetic material, the combination of a closed conductor, means for providing a substantially uniform magnetic field through which said conductor is adapted to move, and a magnetic circuit, including the piece to be tested, interlinked with said movable conductor.

4. In an instrument for testing the magnetic qualities of a sample of iron or other metal, the combination of a closed conductor, and means for generating in said conductor two electromotive forces, one due to variations of flux in the test sample and the other due to motion of the conductor.

In witness whereof I have hereunto set my hand this 23d day of June, 1903.

FRANK HOLDEN.

Witnesses:
   H. D. JAMESON,
   F. L. RAND.